(12) United States Patent
Subramanian et al.

(10) Patent No.: US 7,428,665 B2
(45) Date of Patent: Sep. 23, 2008

(54) METHODS AND STRUCTURE FOR DETECTION AND HANDLING OF CATASTROPHIC SCSI ERRORS

(75) Inventors: Ramya Subramanian, Fremont, CA (US); Lai-Ying Lau Stepan, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 473 days.

(21) Appl. No.: 10/986,751

(22) Filed: Nov. 12, 2004

(65) Prior Publication Data

US 2006/0112304 A1    May 25, 2006

(51) Int. Cl.
    *G06F 11/00* (2006.01)
(52) U.S. Cl. ......................................................... 714/43
(58) Field of Classification Search .................. 714/43, 714/56
    See application file for complete search history.

(56) References Cited

U.S. PATENT DOCUMENTS

| | | | | |
|---|---|---|---|---|
| 5,392,425 | A * | 2/1995 | Elliott et al. ................... | 714/16 |
| 6,032,271 | A * | 2/2000 | Goodrum et al. ............... | 714/56 |
| 6,125,454 | A * | 9/2000 | Mossner et al. ................ | 714/4 |
| 6,151,649 | A * | 11/2000 | Liong et al. .................. | 710/314 |
| 6,453,429 | B1 * | 9/2002 | Sadana .......................... | 714/43 |
| 6,574,752 | B1 * | 6/2003 | Ahrens et al. ................. | 714/43 |
| 6,574,755 | B1 * | 6/2003 | Seon ............................ | 714/56 |
| 6,629,062 | B2 * | 9/2003 | Coffey et al. ............... | 702/188 |
| 7,120,837 | B1 * | 10/2006 | Ferris ........................... | 714/56 |
| 2001/0020277 | A1 * | 9/2001 | Deenadhayalan et al. ... | 713/323 |
| 2002/0010883 | A1 * | 1/2002 | Coffey et al. ............... | 714/712 |

OTHER PUBLICATIONS

SCSI Accessed Fault-Tolerant Enclosures Interface Specification nStor Corporation and Intel Corporation Apr. 14, 1997.*

* cited by examiner

*Primary Examiner*—Robert Beausoliel
*Assistant Examiner*—Amine Riad
(74) *Attorney, Agent, or Firm*—Duft Bornsen & Fishman LLP

(57) ABSTRACT

Methods and associated structure for rapidly detecting a catastrophic failure of a bus structure within a storage subsystem. Features and aspects hereof associated with SCSI bus storage system configurations coordinate such failure detection with standard monitoring features of the SAF-TE enclosure monitoring specifications. In particular, standard polling operations of a SAF-TE compliant enclosure may be terminated early so as to preclude queuing additional polling related commands for disk drives or an enclosure of disk drives coupled to a SCSI bus cable or backplane that has experienced a catastrophic failure. Other features and aspects hereof disable all disk drives in a storage system that are coupled to a failed common bus.

8 Claims, 3 Drawing Sheets

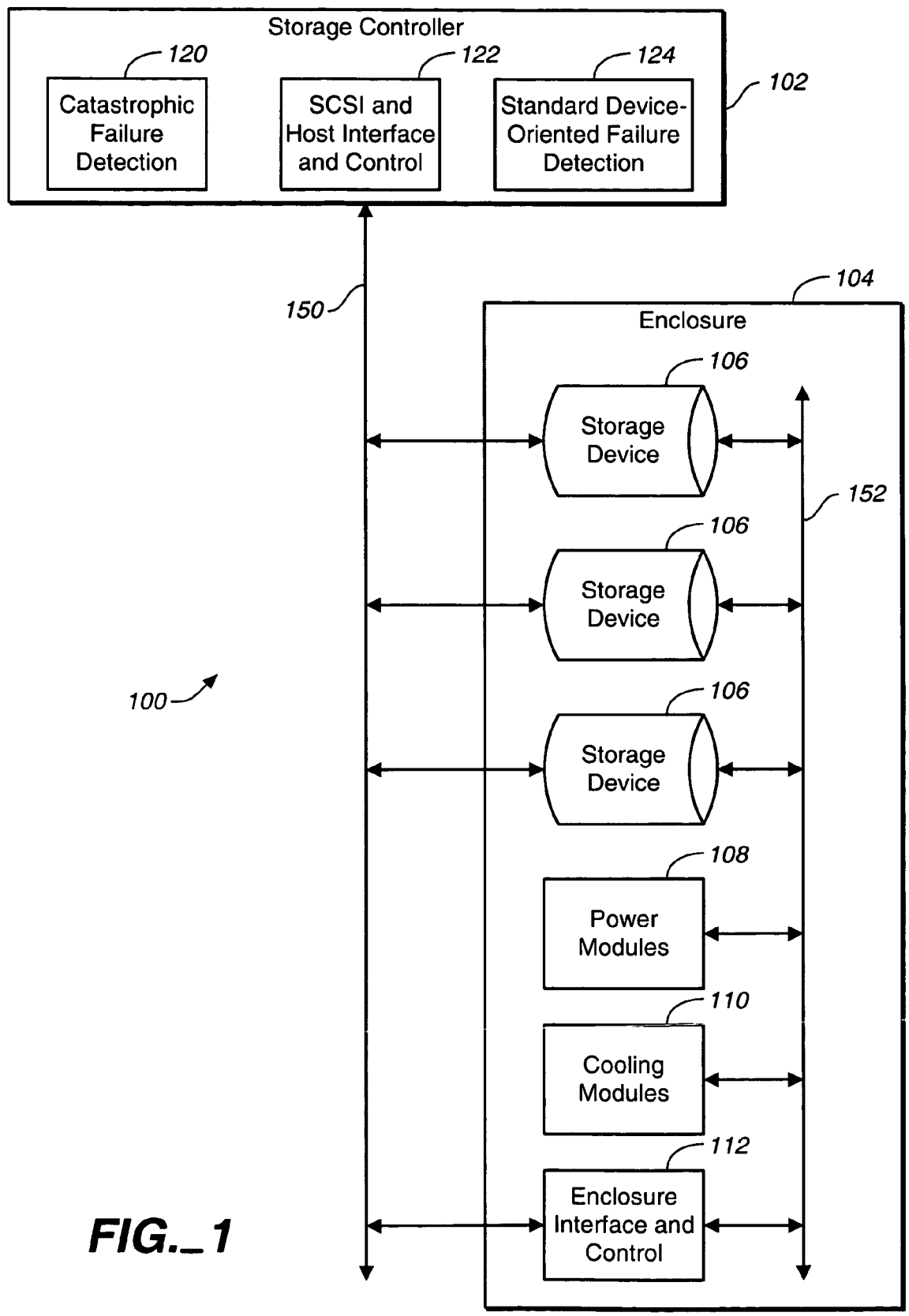
FIG._1

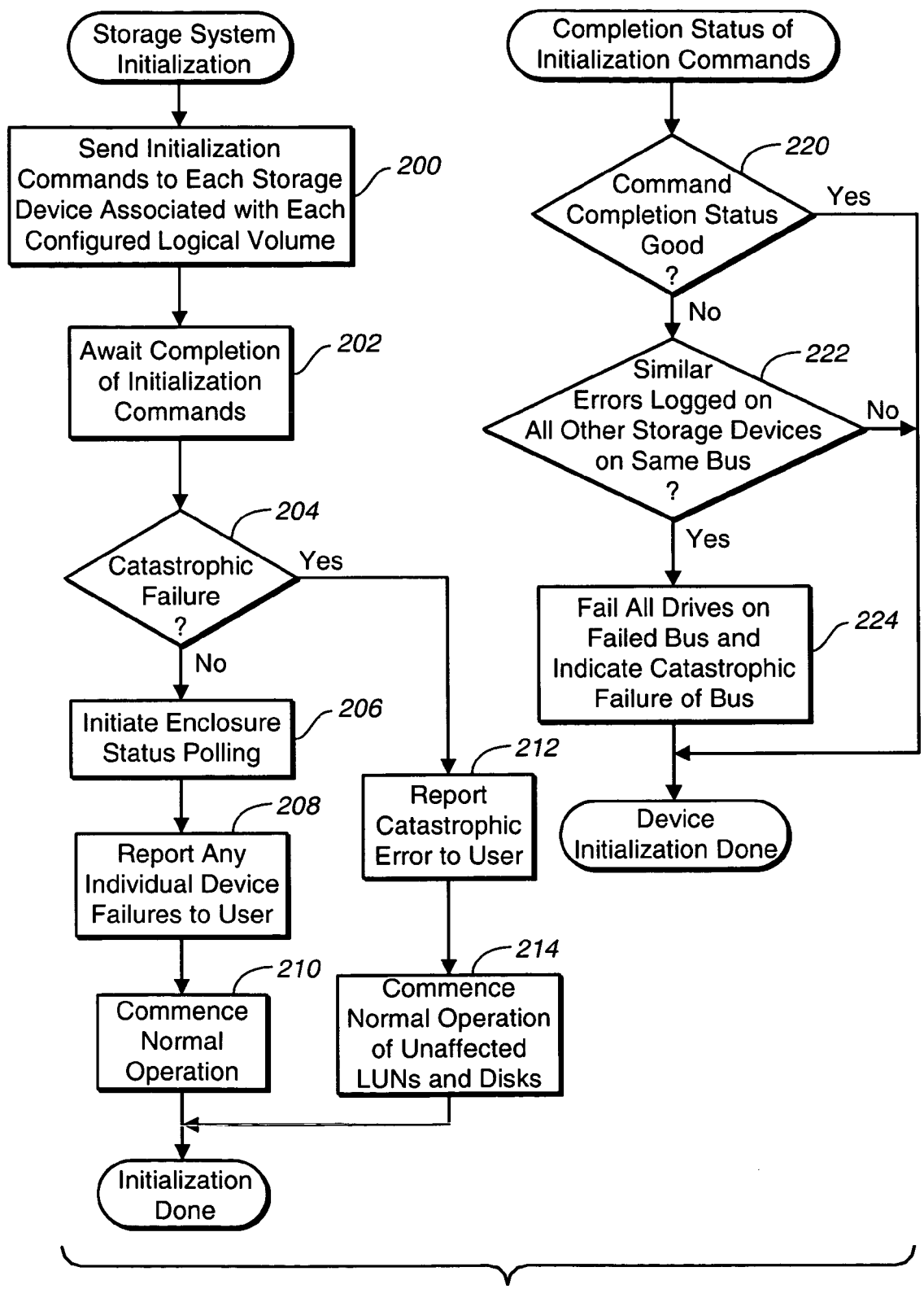
FIG._2

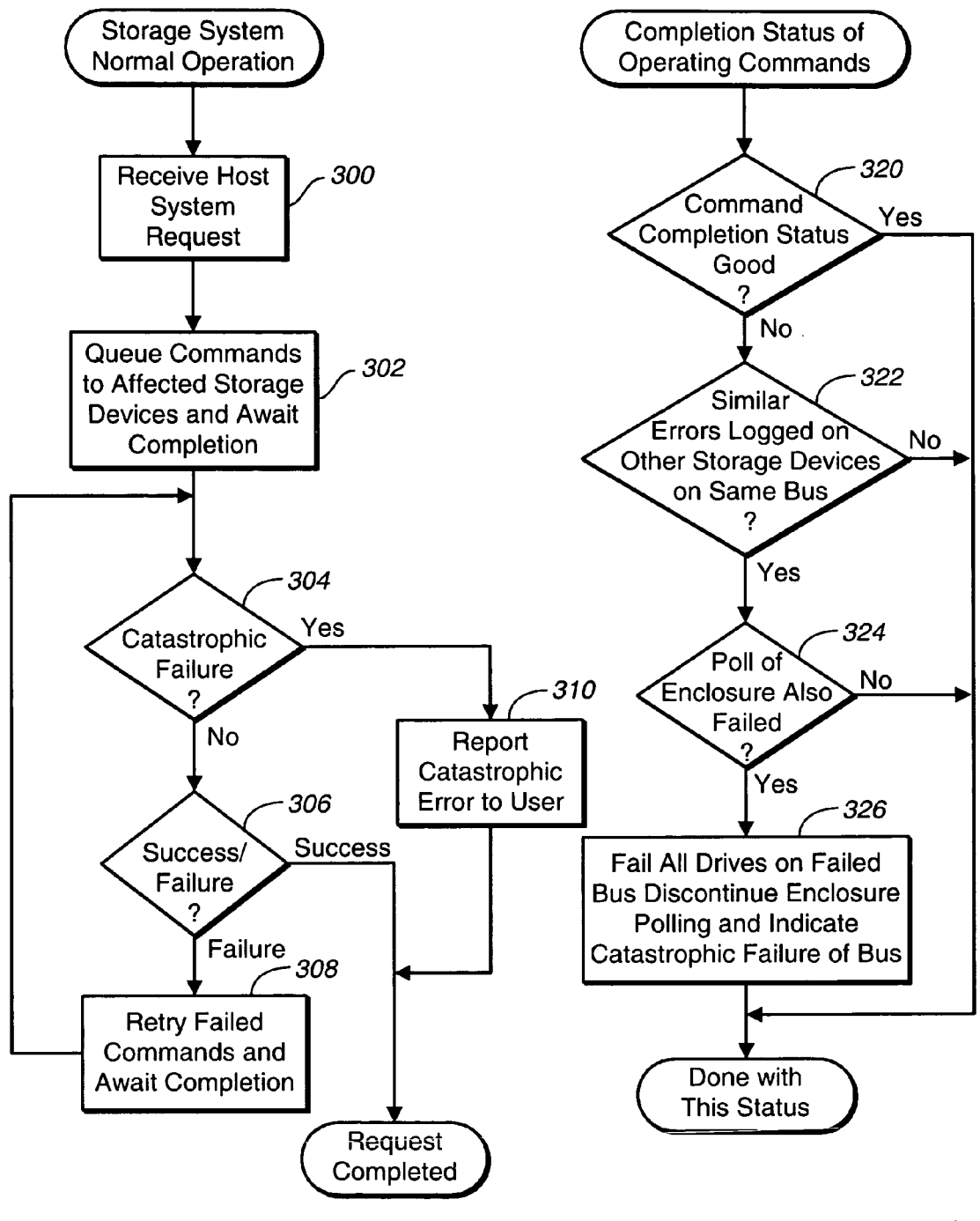
FIG._3

METHODS AND STRUCTURE FOR DETECTION AND HANDLING OF CATASTROPHIC SCSI ERRORS

BACKGROUND OF THE INVENTION

1. Field of the Invention

The present invention relates generally to SCSI peripheral device connection and more specifically relates to methods and structure for rapid detection and handling of parallel SCSI bus (i.e., cable or backplane) failures particularly in the context of storage subsystem communication.

2. Discussion of Related Art

Small computer system interface (SCSI) is a widely accepted standard for coupling peripheral devices to associated host computing systems. Standards and specifications for various related SCSI protocols and media are readily available at, for example, www.t10.org and are well known to those of ordinary skill in the art. In particular, the SCSI parallel bus structure has been widely adopted for coupling storage devices and storage subsystems to computing systems such as workstations or personal computers. Further, parallel SCSI bus structures are frequently applied within storage subsystems, such as RAID storage subsystems, where a storage controller enclosed within the storage subsystem is coupled to multiple SCSI disk drives.

The parallel SCSI bus structure is often implemented as a plurality of parallel signal paths such as a cable or a backplane structure. Certain of the multiple signal paths are defined for transferring data while others are defined to transfer related control and status signal to control the flow of information between an initiator device and a target device—each coupled to the parallel bus structure.

As is well known in the art, when a disk drive of a storage system fails, the host system or storage controller coupled to the failed disk drive may attempt various actions to retry the failed operation in hopes a retry may succeed and, if not, to confirm failure of the disk drive. Typically, such verification may entail a number of retry attempts each after a timeout period awaiting a successful completion of an attempted exchange. Each successive retry may incur the same time out delay. Detecting the apparent failure of the device may therefore incur a significant delay in operation of the storage subsystem. After some predetermined number of such failures and retries, the device may be declared by a storage controller or host system as failed so as to preclude queuing additional operations to the failed device. Where a storage system includes a plurality of disk drives coupled to a common SCSI bus or multiple disk drives distributed over multiple SCSI bus is, the catastrophic failure of a SCSI bus may appear to the system as a failure of multiple disk drives. Thus, the failure detection features discussed above and the associated delays in detecting a failed disk drive are duplicated multiple times—once for each retry for each disk drive coupled to a common SCSI parallel bus.

These delays associated with detecting the failure of each of multiple disk drives on a common SCSI parallel bus can impose a significant burden in time for a system with a failed SCSI bus. A catastrophic failure of a SCSI bus system may be, for example, broken or shorted signal path in a SCSI bus cable or backplane. In such a catastrophic failure, each disk drive coupled to the common, failed SCSI bus will appear to the system as a failed disk drive. Each disk drive may sequentially be detected as failed by a sequence of retry steps and associated timeout delays. Thus, a failed SCSI parallel bus may impose a significant delay in the initialization or operation of a storage subsystem or host system using multiple disk drives coupled to a common, failed SCSI bus structure. For example, if a SCSI bus first fails during boot up initialization of a storage subsystem or host system with multiple disk drives, the disk drive initialization routine may have queued a plurality of commands to each disk drive to initialize operation of each drive. Thus, each of the plurality of queued commands for each of a plurality of disk drives coupled to a failed SCSI bus will incur the delay problems discussed above in detecting what appears to this system or storage controller as a plurality of failed disk drives. Similarly, if the SCSI bus in a storage system fails after the system has started normal operation, and if the system happens to be in the midst of processing a significant load of pending operations, each of the commands queued for the multiple pending operations for the multiple disk drives may be retried several times. In both cases, each queued command will be forwarded to the corresponding disk drive and, after detecting a timeout condition, retried some number of time. Each retry incurs a significant timeout delay until ultimately, sequentially, each drive on the shared SCSI bus will be deemed as failed.

Still further, more recent SCSI configurations and standards provide for intelligent enclosures that use SCSI command and status protocols to monitor the status of a plurality of disk drive housed within the intelligent enclosure. The SCSI SAF-TE standards (also available at www.t10.org and generally known to those of ordinary skill in the art) define protocols for inquiring of the status of all devices in an enclosure by polling for status using SCSI commands. These polling commands and replies are forwarded to the SAF-TE compliant enclosure over a SCSI bus which may also fail. Thus, the periodic polling sequences to determine the status of an enclosure of multiple disk drives may incur similar delays periodically in the initialization or operation of a SCSI storage system.

It is evident from the above discussion that a need exists for improved failure detection of catastrophic failures in a parallel SCSI bus structure or other similar parallel bus structures coupling a plurality of disk drives to a storage controller or host system.

SUMMARY OF THE INVENTION

The present invention solves the above and other problems, thereby advancing the state of the useful arts, by providing methods and associated structure for more efficiently detecting such a catastrophic SCSI failure such as a failure of a SCSI bus cable or backplane structure. Features and aspects hereof are operable to detect that every device on a parallel SCSI bus structure has failed in the same manner and to thereby determine that the failures actually represent a catastrophic failure of the common SCSI bus structure coupling the apparently failing drives to the storage controller or host adapter. By so detecting that the failure represents a catastrophic failure of a common SCSI bus cable or backplane, methods and structures hereof need not sequentially determine that each disk drive of a storage subsystem has failed but rather may quickly determine that a SCSI bus element common to all apparently failed disk drives has encountered a catastrophic failure. In like manner, other features and aspects hereof reduce the time to sense a failure of a storage device enclosure communicatively coupled to a storage controller or host adapter. Polling of a failed storage enclosure may be quickly eliminated or reduced where the storage controller detects a failed SCSI bus in accordance with features and aspects hereof.

A first feature hereof provides a method for detecting a catastrophic failure of a bus in a storage system, the method comprising: detecting related failures of multiple devices coupled to a common bus; and detecting catastrophic failure of the common bus in response to detection of said related failures.

Another aspect hereof further provides that the steps are operable during initialization of the storage system.

Another aspect hereof further provides that the step of detecting related failures further comprises: detecting identical failures of multiple storage devices coupled to the common bus before attempting a retry of any of the detected failures.

Another aspect hereof further provides for: failing all storage devices in the storage system that are configured in RAID logical units and coupled to the failed common bus; and blocking further transmission to storage devices coupled to the failed common bus that are not configured in a RAID logical unit.

Another aspect hereof further provides for: failing to detect the presence of a SAF-TE compliant enclosure coupled to the failed common bus.

Another aspect hereof further provides that the steps are operable during normal operation of the storage system.

Another aspect hereof further provides that the step of detecting related failures further comprises: detecting a timeout failure of a storage device coupled to the common bus; and detecting a timeout failure of a SAF-TE compliant storage enclosure coupled to the common bus.

Another aspect hereof further provides for: notifying a user of the likely catastrophic failure of the common bus rather than the failure of each of the multiple devices coupled to the common bus.

Another feature hereof provides a method operable in a storage system having multiple disk drives in a SAF-TE storage enclosure all coupled to a common SCSI bus, the method for detecting failure of the common SCSI bus comprising: detecting a failed operation sent to at least one of the multiple disk drives from a storage controller; detecting a related failed operation sent to the storage enclosure from the storage controller; and determining that the common SCSI bus has failed in response to detection of the failed operation and the related failed operation.

Another aspect hereof further provides for: notifying a user of the failure of the common SCSI bus without notifying the user of the detected failed operation or the detected related failed operation.

Another aspect hereof further provides that the step of detecting a failed operation comprises detecting the failed operation sent to a disk drive that is configured in a RAID volume, and provides that the method further comprises: disabling all disk drives of said multiple disk drives configured in the RAID volume and coupled to the failed common SCSI bus in response to determining that the common SCSI bus has failed.

Another aspect hereof further provides for discontinuing polling operations directed from the storage controller to the storage enclosure in response to determining that the common SCSI bus has failed.

BRIEF DESCRIPTION OF THE DRAWINGS

FIG. 1 is a block diagram of a storage system in which features and aspects hereof may be advantageously applied to rapidly identify and process catastrophic failure of a shared resource in a storage system such as a common shared bus coupled to multiple storage devices within the storage system.

FIG. 2 is a flowchart describing a method to initialize a storage system in accordance with features and aspects hereof to rapidly identify a catastrophic failure of a shared resource in the storage system associated with each of multiple storage devices therein.

FIG. 3 is a flowchart describing a method to operate a storage system in accordance with features and aspects hereof to rapidly identify a catastrophic failure of a shared resource in the storage system associated with each of multiple storage devices therein.

DETAILED DESCRIPTION OF THE DRAWINGS

FIG. 1 is a block diagram showing a system 100 embodying features and aspects hereof to rapidly isolate and handle catastrophic errors of a shared resource associated with each of multiple storage devices in the system. In the context of a SCSI storage subsystem, a SCSI bus internal to the storage system may be exemplary of such a shared resource associated with multiple storage devices of the system.

Storage controller 102 may include SCSI/host interface and control element 122 for providing low level control of a SCSI bus 150 as well as interface and control logic associated with host communications with attached host systems (not shown). Those of ordinary skill in the art will recognize that storage controller 102 may be a host bus adapter that plugs directly into a host system peripheral bus such as a PCI or other industry standard peripheral interconnect bus structures. In such a case, SCSI and host interface and control logic 122 provides direct bus interfacing with the particular host bus providing peripheral interaction. In addition, those of ordinary skill in the art will recognize that storage controller 102 who may also comprise a storage controller device embedded within a storage subsystem 100. Such a storage subsystem 100 may interact with attached host systems through other well-known communication media and protocol including, for example, Fibre Channel, Ethernet, parallel SCSI buses, and various high speed parallel and serial communications media and protocol commonly used for interconnecting one or more computing systems with network attached or locally attached storage.

As presently practiced in the art, storage controller 102 may include standard device oriented failure detection and processing logic 124. As individual components of system 100 are controlled by storage controller 102, particular failure status may be processed in accordance with normal processing of storage controller 102. For example, as presently practiced in the art, read or write operations directed over bus 150 to storage devices 106 may detect an error status in completing a requested read or write operation. Standard device oriented failure detection and processing element 124 therefore may initiate retries or other corrective action in attempts to continue normal processing within system 100.

As shown in FIG. 1, storage controller 102 interacts with storage devices 106 and other components via bus 150. As generally known in the art, bus 150 may be a parallel SCSI bus structure, other parallel bus structures, a serial communication media or other well-known communication media and associated protocols. In particular, communication medium 150 may be a parallel SCSI bus structure having a plurality of parallel conductive paths for exchanging data and associated control signals. Controller 102 may therefore exchange data with various components of the system 100 including, for example, storage devices 106 and enclosure interface and control element 112 of storage enclosure 104. In addition, those of ordinary skill in the art will readily recognize that communication medium 150 who may also comprise multiple communication paths top provide additional reliability through redundancy of the communication link.

Storage devices 106 maybe any suitable disk drive or other appropriate storage devices useful for a particular application. Storage enclosure 104 may be a physical housing for enclosing storage devices 106 as well as associated power modules 108 and cooling modules 110. As it is generally known in the art, storage enclosure 104 may also provide a level of processing intelligence wherein an enclosure interface and control logic element 112 may interact locally with components and modules within the storage enclosure 104. Such local interaction may be achieved through bus or backplane structure 152. For example, enclosure interface and control logic element 112 may monitor environmental and other factors within the storage enclosure 104. Information so retrieved may invoke local control strategies within enclosure interface and control logic element 112 to alter power signals applied to various components, to manage and control hot swap of modules within the enclosure 104, and to ensure proper cooling of components operating within the storage enclosure 104. In addition, enclosure interface and control logic element 112 may communicate information regarding the environment of the storage enclosure 104 through communication medium 150 to storage controller 102.

As noted above and as shown in FIG. 1, multiple devices may be coupled to a common shared bus or communication medium 150. A catastrophic failure of the communication medium, per se, may be perceived by storage controller 102 as multiple failures of each of the multiple devices—one failure for each retry of a failed operation on each of the multiple storage devices. Such failure processing by standard device oriented failure detection and processing element 124 within storage controller 102 can be time consuming and hence impact overall system performance by delaying detection of the actual failure and notification to a user to provide appropriate corrective action.

By contrast, features and aspects hereof shown as catastrophic failure detection logic element 120 of storage controller 102 monitor the failure processing and detection within storage controller 102 (i.e., processing of standard device oriented failure detection and processing element 124). When catastrophic failure detection logic element 120 notices that multiple devices known to be attached to a common bus interface are failing with the same or similar failure modes, element 120 may shortcut standard processing for retries on each of the failed operations and notice that the failure is likely a catastrophic failure of the common, shared communication medium 150. For example, if during initialization of system 100, standard device oriented failure detection and processing element 124 senses is a timeout error in initialization commands sent to each storage device 106 in enclosure 104, catastrophic failure detection element 120 may instead determine that the likely failure is a catastrophic failure of communication medium 150. Having so determined that a catastrophic failure likely occurred, further retry processing by standard device oriented failure detection element 124 may be terminated and a report generated for an administrative user indicating a likely catastrophic failure of the common shared communication medium 150.

Further, as discussed herein below, in accordance with well-known SAF-TE specifications, storage controller 102 may periodically poll enclosure 104 to receive status information regarding environmental aspects of enclosure 104 as reported by enclosure interface and control element 112. Attempts to continue polling may also be terminated when a catastrophic failure is detected by catastrophic failure detection element 120. Thus, additional retry attempts and additional error reports need not be generated due to continued polling of the enclosure and an appropriate error report may be presented to a user indicating in likely catastrophic failure of the common interface 150.

Those of ordinary skill in the art will readily recognize that FIG. 1 is intended merely as exemplary of one typical configuration where features and aspects hereof may be advantageously applied. Numerous other configurations and topologies will be readily apparent to those of ordinary skill in the art. For example, individual storage devices may be coupled to communication medium 150 without necessarily requiring enclosure 104. Still further, any number of such storage devices either within, or outside of, such storage enclosures may be included in system 100. FIG. 1 is therefore merely intended as exemplary of one possible such embodiment.

FIG. 2 is a flowchart describing a method in accordance with features and aspects hereof to rapidly identify and handle a catastrophic error such as a SCSI bus failure within a storage system. The method of FIG. 2 is generally operable to identify and handle a catastrophic error during storage system initialization. In general, during initialization, errors may be detected in a storage system as storage devices and corresponding logical volumes comprising portions of the storage devices are initialized and configured. The process of initializing or configuring logical volumes typically involves some initial reading and/or writing of information on each disk drive associated with a configured volume. Even storage devices or disk drives that are not a part of a configured logical volume may be contacted by the controller during initialization so that the storage controller can identify information regarding the disk drive (i.e., capacity, speed, or other characteristics and attributes of the disk drive). As noted above, features and aspects hereof rapidly identify and handle a catastrophic failure as compared to prior known techniques. A catastrophic failure may include, for example, failure of a common SCSI bus (or other communication media) coupled between a storage controller and multiple storage devices and/or coupled to a storage enclosure comprising multiple storage devices.

Element 200 is first operable to generate and transmit assorted initialization commands to each of multiple storage devices in the storage subsystem. For example, each storage device that comprises a part of a configured logical volume known to the storage controller may be contacted by the storage controller to verify its proper operation and various parameters and attributes of the storage device. Typically these initialization commands may consist of read and write operations to read/write attributes associated with the storage device as well as to read/write configuration data stored on storage devices associated with a logical volume. Element 202 is then operable to await completion of the initialization commands. The completion may be indicated by successful status returned to the initialization procedure or various types of failures. Element 204 is then operable to determine whether the initialization commands have completed with a catastrophic failure status or another status.

If the returned status does not indicate a catastrophic failure but rather success or a different failure mode, element 206 is then operable to initiate storage enclosure status polling operations. As generally known in the art, a SAF-TE compliant enclosure may report status information regarding the environment of the enclosure as well as storage devices within the enclosure. Typical storage management applications receive such environmental information by periodically pulling the enclosure through the communication medium coupled thereto. If a catastrophic failure has not been sensed by operation of elements 200 through 204, element 206 may initiate such polling operations to verify proper environmental parameters for the enclosure. Element 208 may then report to an administrative user any individual device failures detected in the initialization commands. Though a catastrophic failure has not been detected, individual storage devices may be reporting particular failures for its particular device operation. Element 210 is then operable to commence normal operation of the storage subsystem. Where individual storage devices may have reported failures, the storage subsystem may be operating in a degraded mode of operation but nonetheless may proceed with processing of I/O requests on behalf of host systems directed toward configured, operating storage volumes.

Where element 204 has sensed a catastrophic failure status report from lower level initialization operations, element 212 is first operable to report the catastrophic error to an administrative user. Rather than reporting numerous individual storage device failures and/or a separate error report for the enclosure (as previously practiced in the art), element 212 is operable to report to the user the likely failure of a common bus coupled to all apparently failing storage devices and/or to the enclosure. In accordance with features and aspects hereof the identified catastrophic failure may be reported rather than individual errors that would require additional time for timeouts and retries to verify failure of the individual storage devices. Thus, the catastrophic failure of a common bus coupled to multiple storage devices within the storage system and/or coupled to the storage enclosure may be more rapidly identified and handled by an administrative user. Element 214 is then operable to commence normal operation of any unaffected portions of the storage subsystem. For example, where a storage subsystem comprises multiple communication media or buses coupled between the storage controller and various of the storage devices, failure of one communication medium or bus within the storage subsystem may represent a catastrophic failure with regard to particular storage devices and logical volumes within the storage subsystem. However, other communication media or buses coupled to storage devices may permit ongoing operation of unaffected logical volumes within the storage system.

Associated with the initialization sequences provided by operation of elements 200 through 214, elements 220 through 224 are operable to receive status information in response to transmitted initialization commands. Receipt of status information from various storage devices and/or from the storage enclosure may be analyzed to determine whether the failures likely represent a catastrophic failure of a common, shared communication medium or bus within the storage system. Element 220 is first operable in response to receipt of a status indication from a storage device or storage enclosure to determine whether the return of status indicates a successful completion or a possible failure. If the status indicates a successful completion, processing continues with normal device initialization as noted above with regard to elements 200 through 214. If element 220 detects that a storage device or enclosure has returned a failure status in response to a transmitted initialization command, element 222 is then operable to determine whether similar errors have been logged for other storage devices coupled to the same communication medium or bus. If all other devices on the same common, shared bus have indicated similar errors processing continues with element 224 as discussed below. If at least one other device on the same storage system common shared bus has indicated successful initialization status or has indicated some other failure mode communicated through the common shared bus, processing continues normally with individual storage devices reporting individual failures rather than detecting a catastrophic failure of a common shared bus.

Where all devices storage devices and a storage enclosure sharing a common bus with the storage controller have reported a similar error, element 224 is operable to determine that a catastrophic failure has likely occurred. For example, if each storage device coupled to a common SCSI bus reports a timeout failure in processing of an initialization command, element 224 is operable to indicate failure of all drives on the shared bus and reports to the initialization processing described above with respect to elements 200 through 214 that a catastrophic failure has likely occurred. The likely catastrophic failure is the failure of a common shared bus or other catastrophic failures that may be indicated for all devices in a storage system sharing a common resource.

Those of ordinary skill in the art will readily recognize numerous equivalent process steps for detecting a catastrophic failure during initialization of a storage system. For example, element 222 may be operable to determine that a catastrophic failure may have occurred when a predetermined significant number of storage devices sharing a common resource in the storage system have reported a particular similar failure. The particular predetermined number and the particular failure may be configured as appropriate for any particular application of features and aspects hereof. Although some devices coupled to the common bus structure may indicate successful initialization or dis-similar failure modes, element 222 may determine that the likely failure is a catastrophic failure of a shared resource associated with some, but not all, devices in the storage system. Most often, a catastrophic failure is detected as the failure of all devices coupled to a common, shared resource. In particular, a typical catastrophic failure is detected as a failed SCSI bus or other bus structure coupling all devices in an enclosure as well as the enclosure to the common, shared bus.

FIG. 3 represents processing of a method in accordance with features and aspects hereof similar to that of FIG. 2 but operable during normal storage system operation rather than at initialization of the storage system. Although a storage system may successfully initialize without significant failure, a shared resource within storage system, such as a common shared bus, may later fail in a catastrophic manner during normal operation of the storage system. As during initialization, features and aspects hereof rapidly identify and handle such a catastrophic failure as compared to time consuming, confusing detection and reporting of numerous, individual storage device failures in the storage system as presently practiced in the art.

Element 300 is first operable to receive an I/O request from an attached host system. The request may be directed to some logical volume comprising portions of one or more storage devices in the storage system. Element 302 then generates, queues and transmits appropriate commands for storage devices affected by the received host system request. Element 302 then awaits completion of the queued and transmitted commands forwarded to the affected storage devices. The completion of the commands will include a status indicating either success or failure, or, in accordance with features and aspects hereof, may indicate a catastrophic failure in a storage system.

Element 304 determines whether the returned status indicates a catastrophic failure and, if so, element 310 reports the catastrophic failure to the user thereby completing the host system I/O request until corrective measures are enacted. As noted above, in accordance with features and aspects hereof, detection and reporting of the catastrophic failure of a shared component or resource within the storage system may be performed more rapidly than the significant time delay associated with multiple timeouts and retries on each of multiple storage devices sharing a common resource. Further, reporting to an administrative user the probability of a single catastrophic failure of a shared component provides clearer direction for repairing the failure of the storage system.

If element 304 determines that no catastrophic failure has been reported, element 306 determines whether the reported status indicates successful completion of the host request or some other failure mode. If another failure mode is reported element 308 performs standard failure recovery attempting appropriate retries for the failed commands and awaiting completion or timeout of each retry. Upon completion of the retry processing, the method continues looping back to element 304 to verify successful completion, or catastrophic failure, or another standard failure mode. Eventually, standard error recovery will succeed or exhaust a maximum number of retries to thereby complete the host system request.

Elements 320 through 326 are operable to asynchronously receive and analyze the status returned from each of multiple devices affected by processing of the host request. Upon return of status information from any device affected by the host request, element 320 is first operable to determine whether the status returned indicates successful completion of the command. If so, normal processing continues in accordance with successful completion of each command. If a failure status is detected by element 320, element 322 next determines whether similar failures have been logged by other devices couple to the same communication medium or bus (i.e., a shared resource within the storage system). If no trend of similar errors is detected by element 322, normal processing continues with a failure status unique to the particular request and or particular storage device. Normal failure processing and retries will handle such a standard failure mode. If element 322 detects a trend of similar errors logged by other devices couple to the same shared resource, element 324 is operable to verify whether the storage enclosure, coupled to the same shared common bus or resource, is also indicating similar failures in the periodic polling thereof. If not, processing may continue with a presumption that standard failures may be processed through normal error recovery techniques of the storage system. If element 324 detects that the periodic calls of the storage enclosure are also failing in a similar manner, element 326 is operable to indicate a catastrophic failure for return to the I/O processing features of elements 300 through 310. In particular, a catastrophic failure may discontinue further polling of the storage enclosure and may indicate a failure of all storage devices coupled to the shared resource (i.e., common shared bus). Thus, features and aspects hereof rapidly identify a catastrophic failure of a shared resource within the storage system without requiring delays associated with numerous retries for each of several storage devices coupled to the failed common resource.

Those of ordinary skill in the art will readily recognize that the processes of FIGS. 2 and 3 are merely exemplary of one possible embodiment of features and aspects hereof. Numerous equivalent methods will be readily apparent to those skilled in the art. In particular, configurations and architectures of lower level "driver" modules and higher level I/O processing will be readily apparent to those skilled in the art. Embodiments of the methods of FIGS. 2 and 3 may vary widely while providing the desired benefits. Numerous architectures and configurations for such storage controllers and the functional features thereof are readily known to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. In a storage system having multiple disk drives in a SAF-TE storage enclosure all coupled to a common SCSI bus, a method for detecting failure of the common SCSI bus comprising:
   detecting a failed operation sent to at least one of the multiple disk drives from a storage controller;
   detecting a related failed operation sent to the storage enclosure from the storage controller; and
   determining that the common SCSI bus has failed in response to detection of the failed operation and the related failed operation.

2. The method of claim 1 further comprising:
   notifying a user of the failure of the common SCSI bus without notifying the user of the detected failed operation or the detected related failed operation.

3. The method of claim 1
   wherein the step of detecting a failed operation comprises detecting the failed operation sent to a disk drive that is configured in a RAID volume, and
   wherein the method further comprises:
   disabling all disk drives of said multiple disk drives configured in the RAID volume and coupled to the failed common SCSI bus in response to determining that the common SCSI bus has failed.

4. The method of claim 1 further comprising:
   discontinuing polling operations directed from the storage controller to the storage enclosure in response to determining that the common SCSI bus has failed.

5. In a storage system having multiple disk drives in a SAF-TE storage enclosure all coupled to a common SCSI bus, apparatus for detecting failure of the common SCSI bus comprising:
   means for detecting a failed operation sent to at least one of the multiple disk drives from a storage controller;
   means for detecting a related failed operation sent to the storage enclosure from the storage controller; and
   means for determining that the common SCSI bus has failed in response to detection of the failed operation and the related failed operation.

6. The apparatus of 5 further comprising:
   means for notifying a user of the failure of the common SCSI bus without notifying the user of the detected failed operation or the detected related failed operation.

7. The apparatus of claim 5
   wherein the means for detecting a failed operation comprises means for detecting the failed operation sent to a disk drive that is configured in a RAID volume, and
   wherein the apparatus further comprises:
   means for disabling all disk drives of said multiple disk drives configured in the RAID volume and coupled to the failed common SCSI bus in response to determining that the common SCSI bus has failed.

8. The apparatus of claim 5 further comprising:
   means for discontinuing polling operations directed from the storage controller to the storage enclosure in response to determining that the common SCSI bus has failed.

* * * * *